Patented July 16, 1929.

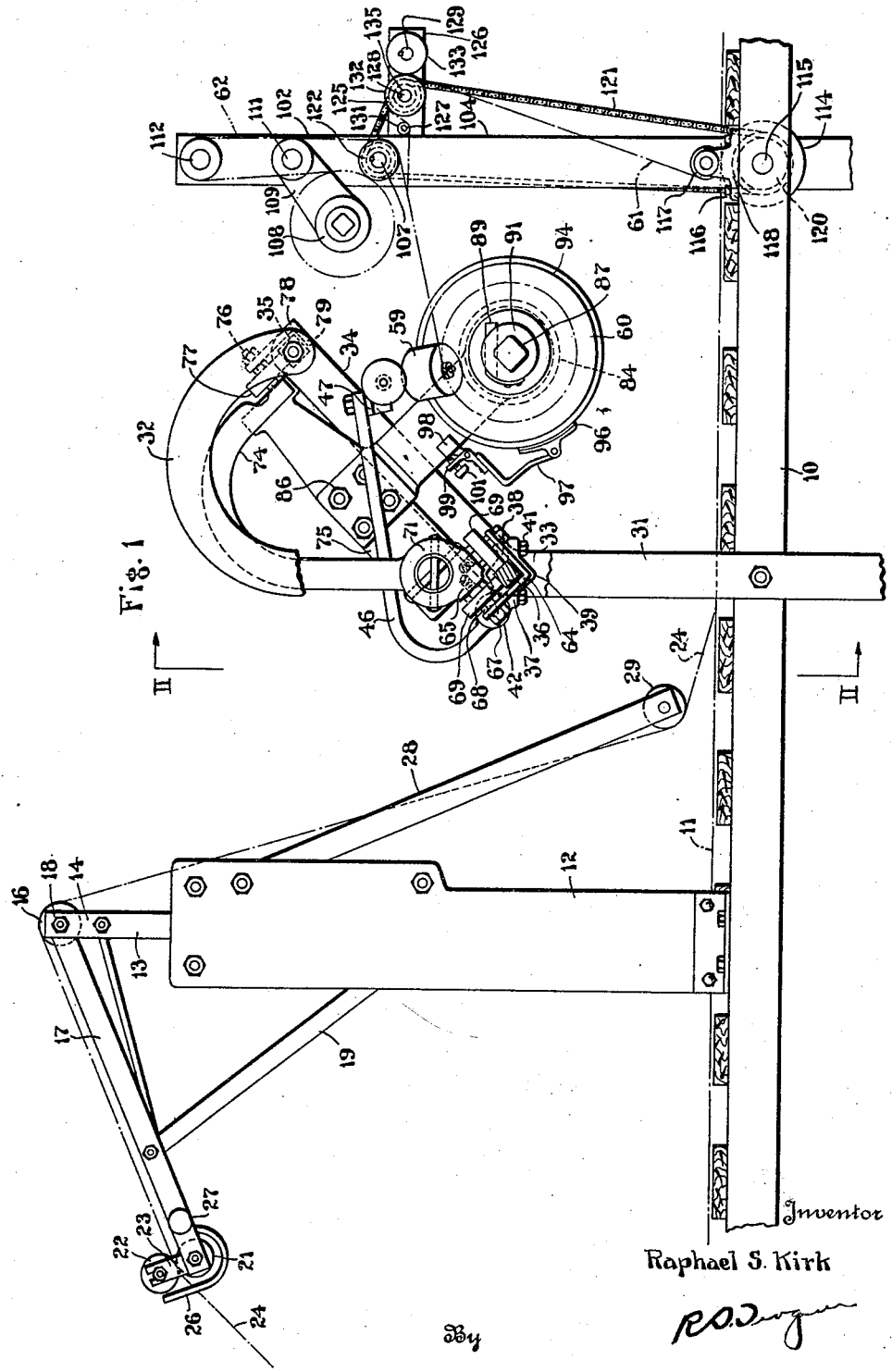

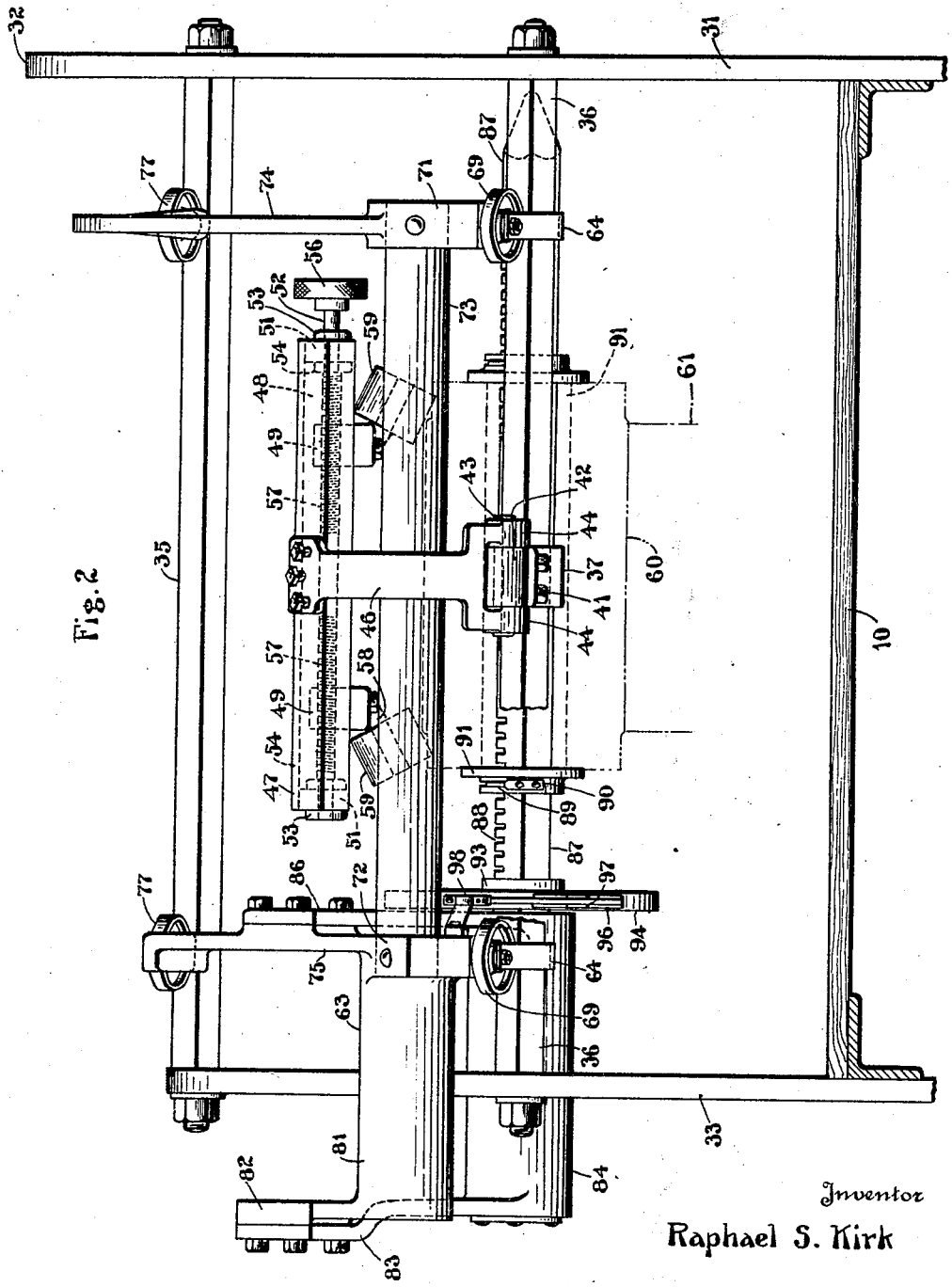

1,721,304

UNITED STATES PATENT OFFICE.

RAPHAEL S. KIRK, OF AKRON, OHIO, ASSIGNOR TO THE GOODYEAR TIRE & RUBBER COMPANY, OF AKRON, OHIO, A CORPORATION OF OHIO.

SQUEEGEE GUIDER.

Application filed April 7, 1928. Serial No. 268,323.

This invention relates to mechanism for assembling sheet material and it has particular relation to a device which is adapted to secure together strips of fabric and strips of rubber to form laminated sheets.

One object of the invention is to provide a device that will accurately align and apply a strip of sheet material from a roll to a second strip which is disposed upon a continuously moving conveyor.

In accordance with ordinary practice, the fabric carcasses of pneumatic tires are composed of a plurality of sheets of rubber coated cord fabric superposed one upon the other. Usually, these sheets are cut on a bias with respect to the longitudinal axes of the cords, and are so disposed with respect to each other that the cords of one sheet cross the cords of adjacent sheets approximately at right angles thereto. When tires having such carcasses are subjected to repeated flexure under service conditions, there is a certain amount of movement between the cords of one ply or sheet of fabric with respect to cords in adjacent plies. This movement tends to produce wear between the cords and, if not prevented, quickly results in the cords becoming so weakened that they fail upon being exposed to ordinary shocks incidental to their use.

To overcome this internal wear, it is customary to dispose a comparatively thin sheet or ply of relatively pure rubber, known as a squeegee strip, between the plies of fabric. The rubber, due to its elasticity, acts as a cushion preventing contact between the cords, but, at the same time, permits comparatively free movement between the plies themselves. In order to apply the ply of rubber to the fabric, strips of fabric, as they come from the bias cutting machine, are spliced together end to end upon an endless belt, and are then passed under a roller which serves to stitch a continuous strip of squeegee material to the surface of the fabric. The gum strip is ordinarily fed from a supply roller, upon which it is wound within the convolutions of a fabric liner. Since it is practically impossible to wind the squeegee strips evenly upon the supply roller, considerable difficulty has been experienced in applying such strips in uniform alignment with respect to the center line of the fabric strip.

This invention consists in the provision of a transversely movable roll holding carriage adjacent the surface of the traveling belt, which supports the fabric strip, and the carriage has guides for engaging the edges of the fabric. The guides engaging the edges of the roll of squeegee material maintain the outer layers of gum upon the roller in exact alignment with the fabric strip at all times, but the movable carriage upon which the roll is mounted permits relative shifting of the main body of the roll, thus preventing undue pressure upon the latter.

For a better understanding of the invention, reference may now be had to the accompanying drawings, forming a part of the specification, in which;

Figure 1 is a side-elevational view of a machine constructed in accordance with the invention; and Figure 2 is an elevational view, of the supply roller supporting mechanism with certain parts of the supporting frame broken away.

In practicing the invention, a table 10, supporting a traveling belt or conveyor 11, is provided. The latter element lies upon the surface of the table and extends between upright members 12, secured in spaced relation upon the upper surface of the table in such position as to support a guide structure 13, that comprises upright members 14, attached to the members 12. A guide roller 16 is journalled between the upright members and inclined members 17 are secured upon a shaft 18 which supports the roller. In order rigidly to support the members 17, upwardly inclined braces 19 are secured at their lower ends to the members 14, and at their upper ends to an intermediate portion of the members 17. A support is thus formed for a second guide roller 21 disposed between the members 17 in position approximately to contact with a guide roller 22, journalled in bearings formed in the upper portion of upright brackets 23 attached to the ends of the members 17 adjacent the roller 21. To center a strip of fabric 24 between the rollers 21 and 22, upwardly extending guide fingers 26 are secured to a transversely extending rod 27, also mounted between the inclined members 17. Arms 28 are pivotally secured to the side portions 12 and are inclined downwardly upon the opposite side of said member from the members 17, thereby functioning as supports for a guide roller 29.

A standard 31 is bolted to the side of the table 10, slightly in advance of the roller 29, and has a forwardly curved upper portion 32. Also, a second standard 33 is bolted to the opposite side of the table 10, from the standard 31, and the upper end thereof is provided with an angularly disposed portion 34, whose outer extremity is connected to the extremity of the curved portion 32 by means of a cross bar 35. The standards 31 and 33 are interconnected intermediate their length by a horizontal cross bar 36 of rectangular cross-section, disposed with two opposite corners in vertical alignment with respect to each other.

A clamp 37, composed of upper and lower portions 38 and 39, respectively, is secured upon the bar 36 by means of connecting bolts 41. The upper portion 38 of the clamp is provided with an integrally formed rearwardly projecting portion 42, which is bored to receive a pin 43, extending in parallel relation with respect to the cross bar 36. Branches 44 of a bifurcated member 46 are journalled upon the pin. The member 46 curves upwardly and forwardly, thereby forming a support for a cross head 47, which is bolted to the free extremity thereof. The cross head is formed with a channel 48, which functions as a guide for slides 49 mounted therein. It will be noted in Figure 2 that the ends of the channel are closed by web portions 51, whereby to form bearings for a relatively long screw 52, which extends longitudinally of the channel 48, through the slides 49. This screw is held against longitudinal movement within the bearing by means of inner and outer collars 53 and 54 mounted thereon. In order to facilitate rotation of the screw, the outer extremity thereof is provided with a knurled head 56. The portions of the screw 52 extending through the slides 49 are provided, respectively, with oppositely extending threads 57, whereby the slides 49 are caused to travel in opposite directions upon rotation of the screw. Stud shafts 58, secured upon the slides 49, extend diagonally downwardly in opposite directions, whereby to form bearings for inclined guide rollers 59 that engage the edges of a roll 60 of a squeegee strip 61.

In order movably to support a roll of gum strip 60, which includes a strip of squeegee material 61 wound within a strip of fabric liner 62, a movable roll holder or carriage 63 is mounted upon the rectangular cross bar 36. The carriage includes a pair of angle bars 64, which extend about the lower portion of the rod 36, and which are provided at their outer extremities with transversely extending studs 65, clamped within openings in the angle members by means of nuts 67 and 68. The studs 65 function as shafts, upon which are journalled pairs of rollers 69, that travel upon the upper inclined faces of the rod 36. It will, also, be noted in Figure 1, that the outer extremities of the studs 65 are screw-threaded into collars 71 and 72, riveted to a tubular member 73 that extends in parallel relation with respect to the bar 36, and thus interconnects the sets of rollers 69.

The collars 71 and 72 are respectively provided with a curved arm 74 and straight arm 75 that extend upwardly and forwardly and terminate adjacent to the cross bar 35. Each arm supports at its extremity, a stud shaft 76, upon which is journalled a guide roller 77, that travels upon the cross bar. Displacement of the rollers from the bar is prevented by means of angle members 78, attached to the ends of the shafts 76, and having end portions 79 hooked beneath the bar.

The collar 72 is formed with a horizontally extending portion 81 that projects outwardly beyond the standard 33, and is provided at the end thereof with an angular portion 82 extending in parallel relation to the arm 75. The extremity of the angular portion 82 is bolted to a corresponding portion 83, upon the outer extremity of an elongate sleeve 84, extending in parallel relation with respect to the element 81. In order to interconnect the inner extremities of members 81 and 84, an integral arm 86, extending in parallel relation with respect to the arm 83, is formed upon the sleeve 84, and is bolted to an intermediate portion of the arm 75. The sleeve 84 is thus rigidly secured to the member 81, whereby to form a support for a squeegee roll supporting shaft 87, which is journalled therein and which extends outwardly in parallel relation with respect to the shaft 36 and the tubular member 73. As shown in Figure 2, the shaft 87 is of rectangular cross-section and at least one edge thereof is formed with a series of notches 88, adapted to receive detents 89 of latches 90, upon the ends of squeegee roll holding collars 91. This construction permits a roll of squeegee material of any convenient width to be secured against longitudinal movement at any convenient point upon the shaft.

To provide a brake for the shaft 87, a collar 93, having a flange portion 94, is secured upon that portion of the shaft adjacent the member 84, and engages a brake shoe 96. The latter is pivotally mounted upon a resilient arm 97, which is, in turn, pivoted to a lug 98 upon the lower edge of the arm 86. Regulation of the amount of pressure exerted by the brake shoe 96 upon the surface of the flange 84, is effected by means of a rearwardly extending portion 99 upon the arm 97, which is threaded to receive a set screw 101 that engages at its inner extremity with the lug 98. By adjusting the set screw 101, and thus elevating or depressing the arm 97, any desired degree of pressure may be obtained upon the shoe 96.

As shown in Figure 2, the squeegee strip 61 upon the roller 87 is somewhat narrower than the liner strip 62, and the projecting edge portions of the latter are left unsupported. Since the liner is placed under considerable tension when wound upon the roller, the unsupported edge portions tend to converge inwardly, thereby relieving the tension upon the portions and, also, defining slight shoulders at the margins of the squeegee strip. The diverging rollers 59 normally rest by gravity upon the shoulders and, in case the squeegee strip is not correctly centered with respect to the rollers, greater weight is exerted upon one shoulder than the other. The component of this force parallel to the axis of the roller tends to move the roller, together with the carriage upon which the roller is mounted, in the direction toward which the force is exerted, until the force upon the two shoulders is approximately equalized, and the squeegee strip is properly centered. The rollers 59 thus tend to maintain that portion of the squeegee strip which is wound in the outer convolutions of liner strip correctly aligned with respect to the conveyor regardless of minor irregularities occurring in winding up the strip.

A rewinding device 102, for unrolling the squeegee strip 61 and for taking up the used liner strip 62, includes a vertically disposed support 104, secured adjacent one side of the table 10. A roller 107, mounted in bearings in the member 104, contacts with and drives a take-up roller 108, that, in turn, is journalled in a bearing formed in the extremity of a swinging arm 109 journalled upon a stud shaft 111, also secured to the upright member 104. The liner strip 62 is looped about a guide roller 112, journalled adjacent to the upper extremities of the upright members, and is then trained about the take-up roller 108. In order to actuate the driving roller 107, and the take-up roller 108, a contact roller 114 is keyed upon a shaft 115, journalled beneath the surface of the table 10, and the upper portion thereof projects upwardly through an opening 116, formed in the table, into contact with the lower surface of the conveyor belt 11. The upper surface of the belt engages a squeegee stitching roller 117, journalled in brackets 118, secured adjacent the edges of the table 10. Sufficient pressure is thus maintained between the belt 11 and the roller 114 to insure positive driving at all times. The roller 117, also, serves to stitch the squeegee strip 103 to the fabric 24.

One extremity of the shaft 115, upon which the roller 114 is mounted, is provided with a sprocket gear 120. Driving connection between the roller 114 and the roller 107 is established by means of a sprocket chain 121, trained about the gear 120 and about a second gear 122, keyed to one extremity of the roller 107.

A stripping device 125 for separating the squeegee strip 61 from the liner 62 comprises a bracket 126, provided with bearings for horizontally projecting shafts 127, 128 and 129. The first mentioned shaft functions as a support for an idler roller 131, and the two last-mentioned shafts rigidly support friction rollers 132 and 133, respectively. Rotative motion is transmitted to the roller 132 by means of a sprocket gear 135 keyed to an extremity of the shaft 128 and engaging the sprocket chain 121.

In order to apply a squeegee strip 61 to a strip of tire fabric 24, the end of the fabric is conducted between the rollers 21 and 22, over the roller 16, and then under the roller 29. The end thereof is then trained upon the surface of the belt 11. The guide fingers 26, together with the rollers thus assure that the fabric will be correctly centered upon the surface of the belt. A roll 60 of squeegee strip 61, wound up in a liner 62, is next mounted upon the shaft 87, and the end of the strip is trained beneath the roller 131, over the roller 132 and then downwardly between that roller and the roller 133, and finally is passed beneath the roller 117. The end of the liner strip 62 is then trained beneath the roller 107 over the roller 112, and is finally wrapped about the take-up roller 108 which contacts with the drive roller 107. Since the rate of travel of the surface of the drive roller 107 is directly proportional to the speed of the belt 11, the liner 62 is rewound upon the roller 108 at approximately the same speed as it is drawn from the supply roller.

From the foregoing description, it will be apparent that the invention includes mechanism whereby correct alignment between a squeegee strip or other strip of sheet material, with respect to a second strip upon a conveyor belt, is maintained at all times. This mechanism is, also, relatively simple and easy to operate.

Although I have illustrated only one form which the invention may assume, and have described in detail only a single application thereof, it will be apparent to those skilled in the art that the invention is not so limited, but that various minor modifications may be made therein without departing from the spirit of the invention or from the scope of the appended claims.

What I claim is:

1. A device for securing together plies of sheet material comprising a conveyor for receiving and transporting one ply, a movable roll holder for receiving and supporting a roll of a second ply, means for supporting the roll holder, and means engaging the marginal portions of the roll to maintain them in alignment with respect to the ply of material upon the conveyor.

2. A machine for applying a squeegee strip to a strip of fabric comprising means for longitudinally transporting the fabric, means for stitching the squeegee strip to the fabric and means for maintaining the edges of the squeegee strip in uniform alignment with respect to the edges of the strip of fabric.

3. A machine for applying squeegee strip to a strip of fabric, comprising a continuously moving conveyor belt, a laterally movable roll holder for receiving a roll of squeegee strip associated with the conveyor belt, and guide means engaging the marginal portions of a roll of squeegee strip upon the holder, whereby to maintain the edges in alignment with respect to a strip of fabric upon the conveyor belt.

4. A machine for applying squeegee strip to a strip of fabric, comprising a continuously moving conveyor belt, a laterally movable roll holder for receiving a roll of squeegee strip associated with the conveyor belt, guide means engaging the marginal portions of a roll of squeegee strip, whereby to maintain the edges in alignment with respect to a strip of fabric upon the conveyor belt, and means for rewinding the liner strip with which the squeegee strip is wound.

5. A machine for applying squeegee strip to a strip of fabric, comprising a continuously moving conveyor belt, a laterally movable roll holder for receiving a roll of squeegee strip associated with the conveyor belt, guide means engaging the edges of a roll of squeegee strip, whereby to maintain the edges in alignment with respect to a strip of fabric upon the conveyor belt, means for rewinding the liner strip with which the squeegee strip is wound, and means for positively driving the rewinding means.

6. A machine for applying squeegee strip to fabric comprising a conveyor belt, supports disposed upon each side of said belt, a cross bar interconnecting the supports, a relatively movable carriage mounted upon the cross bar, a squeegee strip roll holder secured to the carriage, a guide member associated with the carriage, and having guide means engaging the edges of a roll of squeegee strip mounted upon the roll holder, whereby to maintain the latter in alignment with respect to a strip of fabric on the conveyor belt.

7. A machine for applying a squeegee strip to a strip of fabric comprising a conveyor belt, supports associated with the conveyor belt, a carriage mounted upon the support, means permitting lateral movement of the carriage with respect to the strip of squeegee upon the belt, arms secured to the carriage, a roll holding shaft secured to the arms, a disc fixedly secured to the shaft, and a brake engaging the surface of the disc.

8. A machine for applying a squeegee strip to a strip of fabric comprising a conveyor belt, means for centering the fabric upon the belt, supports associated with the belt, a squeegee strip roll holding shaft mounted upon the support, and means for maintaining the edge portions of the roll in accurate alignment with respect to the sheet of fabric upon the conveyor belt.

9. A machine for applying a squeegee strip to a strip of fabric comprising, a conveyor belt for transporting the fabric, a carriage disposed above the belt and mounted for free transverse motion with respect thereto, a holder for a roll of squeegee strip mounted upon the carriage in transverse relation with respect to the belt, a support disposed adjacent the carriage, a pair of guide rollers secured to the support in such position as to engage the edges of a roll of squeegee strip disposed upon the holder, the portion of the surface of each of the rollers contacting the edge of the squeegee strip roll being disposed in angular relation with respect to the corresponding portion of the surface of the other roller, whereby to maintain the squeegee strip in proper alignment with respect to the fabric upon the belt, while the strip is being drawn from the roll.

In witness whereof, I have hereunto signed my name.

Signed at Akron, in the county of Summit and State of Ohio, U. S. A., this 3rd day of April, 1928.

RAPHAEL S. KIRK.